F. L. WANKLYN.
VEHICLE TIRE.
APPLICATION FILED MAY 4, 1920.
1,367,676.
Patented Feb. 8, 1921.
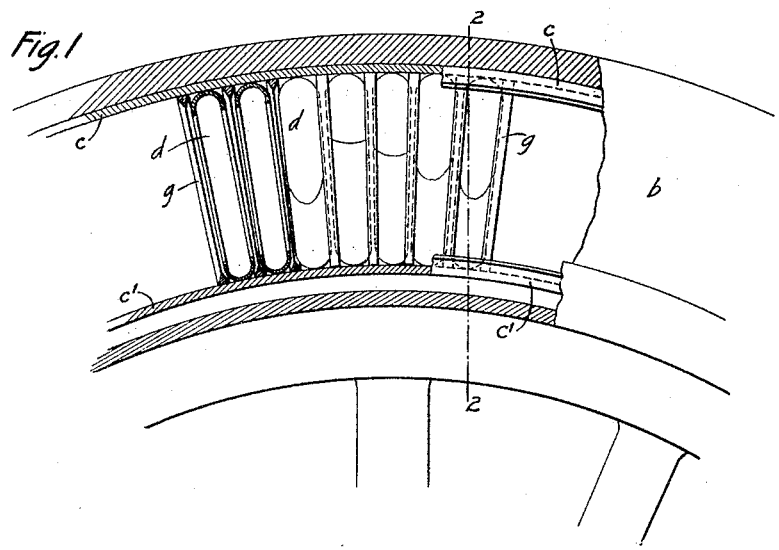
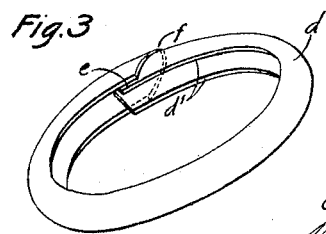
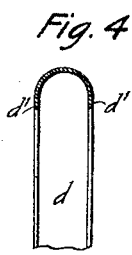
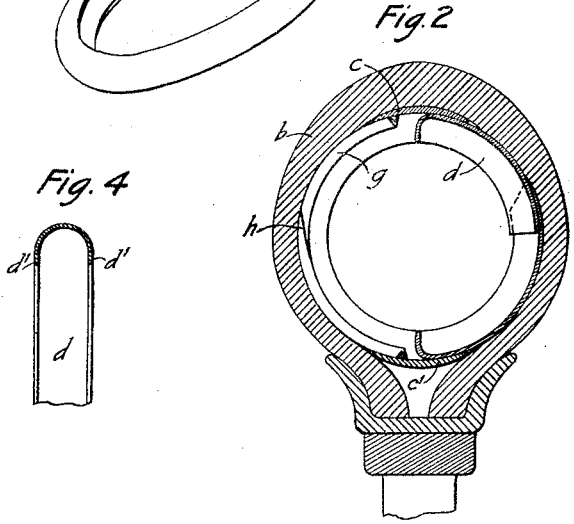
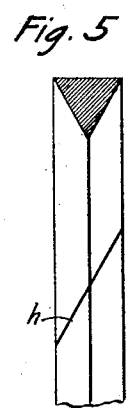
Inventor.
FREDERIC L. WANKLYN:
Per Attorney.

UNITED STATES PATENT OFFICE.

FREDERIC L. WANKLYN, OF MONTREAL, QUEBEC, CANADA.

VEHICLE-TIRE.

1,367,676.  Specification of Letters Patent.  Patented Feb. 8, 1921.

Application filed May 4, 1920. Serial No. 378,867.

*To all whom it may concern:*

Be it known that I, FREDERIC L. WANKLYN, of the city of Montreal, District of Montreal, Province of Quebec, Dominion of Canada, have invented certain new and useful Improvements in Vehicle-Tires; and I do hereby declare that the following is a full, clear, and exact description thereof.

My invention relates particularly to tires for motor vehicles and has for its object to provide a tire of this type which will be non-puncturable and more durable and less costly to obtain and maintain than cushion tires for heavy vehicles heretofore available.

The invention consists of the combination with an ordinary tire casing of a number of metal rings each separate and distinct, of a diameter equal to the interior measurement of the tire casing or, in other words, equal in diameter to the usual inflated inner tube, sufficient of these rings being provided to when ranged side by side completely fill the tire casing in the same manner as the inflated inner tube, the difference in diameter between the inner and outer circumference of the tire casing being compensated preferably by a second system of rings of substantially triangular sections which act as fillers.

For full comprehension however of my invention reference must be had to the accompanying drawings in which similar reference characters indicate the same parts and wherein:

Figure 1 is a fragmentary view of a wheel provided with a tire and constructed according to my invention, the tire being partly broken away for the purpose of illustration;

Fig. 2 is a transverse sectional view taken on line 2—2 Fig. 1;

Fig. 3 is a perspective view of one of my tire rings removed;

Fig. 4 is a detail transverse sectional view of a part of one of these rings; and Fig. 5 is a detail sectional view of one of the filler rings.

The usual tire casing is indicated at $b$. Within this tire casing are a pair of lining or bearing segments $c$ and $c^1$ for resisting the thrust of my improved tire rings.

The improved tire rings, of which there are sufficient when arranged side by side to completely fill the tire casing are the same in all respects. One of these tire rings is illustrated in Fig. 3. It consists of a resilient steel ring $d$ of U-cross section, the legs $d^1$ of which extend inwardly while it is produced from a length sufficient to have its ends overlap as indicated at $e$ when spun to form and curved to the diameter required, the outer end $f$ being preferably sheared off to avoid presenting a sharp edge at the periphery. These rings preferably consist of spun strip-steel suitably tempered after forming and when assembled as shown in Figs. 1 and 2 between the bearing segments $c$ and $c^1$ are sufficient for small tires.

For relatively large tires I provide a second system of rings $g$ produced from resilient steel of triangular cross section and of sufficient length to when curved to the desired diameter have their ends overlapping as shown at $h$, these overlapping ends being preferably scarfed as shown particularly in Fig. 5 to provide for an overlap without distortion of the true circular form of the ring. These secondary rings act as fillers in the spaces between the main cushion rings $d$ and take part of the load. These auxiliary rings preferably consist of steel wire suitably tempered after forming.

A tire constructed in this manner whether for sustaining heavy or light loads, that is to say, with or without the secondary system of rings, possesses maximum resiliency and may be produced at a reasonable price and besides having superior lasting qualities is puncture proof, the principal cushion rings $d$ may be of such dimensions and thickness best suited to the requirements of tires of varying diameter, calibers and gage of metal and to sustain practically any load carried by motor cars of any class.

What I claim is as follows:

1. A vehicle tire consisting of a tire casing filled with radially arranged resilient rings, each consisting of a length of strip steel bent in ring form with its ends overlapping and suitably tempered and presenting U cross-section with the legs of the U extending inwardly.

2. A vehicle tire consisting of a tire casing filled with radially arranged resilient rings, each consisting of a length of strip-steel bent in ring form with its ends overlapping and presenting U cross-section with the legs of the U extending inwardly, and a second system of rings between the first mentioned rings and filling the spaces therebetween.

3. A vehicle tire consisting of a tire casing filled with radially arranged resilient rings, each consisting of a length of strip-steel suitably tempered and presenting U cross-section with the legs of the U extending inwardly, and a second system of rings between the first mentioned rings and filling the spaces therebetween, such last mentioned rings being of triangular cross-section.

In testimony whereof I have signed my name to this specification in the presence of two witnesses.

FREDERIC L. WANKLYN.

Witnesses:
    GORDON G. COOKE,
    WILLIAM J. C. HEWETSON.